(12) United States Patent
Hikmet

(10) Patent No.: US 8,042,960 B2
(45) Date of Patent: Oct. 25, 2011

(54) ILLUMINATION DEVICE FOR PRODUCING A POLARIZED LIGHT BEAM

(75) Inventor: Rifat A. M. Hikmet, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 454 days.

(21) Appl. No.: 12/295,231

(22) PCT Filed: Apr. 3, 2007

(86) PCT No.: PCT/IB2007/051191
§ 371 (c)(1),
(2), (4) Date: Sep. 29, 2008

(87) PCT Pub. No.: WO2007/113768
PCT Pub. Date: Oct. 11, 2007

(65) Prior Publication Data
US 2009/0168394 A1  Jul. 2, 2009

(30) Foreign Application Priority Data
Apr. 6, 2006  (EP) ..................................... 06112309

(51) Int. Cl.
*F21V 9/14* (2006.01)
(52) U.S. Cl. ..................................... 362/19; 362/296.05
(58) Field of Classification Search .................... 362/19, 362/296.05, 346, 347, 331, 302; 356/394, 356/369, 364
See application file for complete search history.

(56) References Cited

U.S. PATENT DOCUMENTS

| | | | |
|---|---|---|---|
| 5,042,925 A | 8/1991 | Broer et al. | |
| 5,764,412 A * | 6/1998 | Suzuki et al. | 359/487 |
| 6,630,974 B2 * | 10/2003 | Galabova et al. | 349/119 |
| 6,788,411 B1 | 9/2004 | Lebens | |
| 2004/0109329 A1 | 6/2004 | Kato | |
| 2004/0120137 A1 | 6/2004 | Williams et al. | |
| 2005/0286251 A1 | 12/2005 | Smith | |
| 2006/0013002 A1 | 1/2006 | Coushaine et al. | |

FOREIGN PATENT DOCUMENTS

EP      1443264 A2    8/2004

* cited by examiner

*Primary Examiner* — Sharon Payne
(74) *Attorney, Agent, or Firm* — John F. Salazar; Mark L. Beloborodov

(57) ABSTRACT

An illumination device for providing a polarized light beam comprising a light source (101) having a light emitting surface arranged to emit light (107) in a plane (X-Y), a first polarizing reflector (103) arranged to enclose a light emitting surface of said light source (101) in said plane, and adapted to receive said light, reflect light (109) of a first elliptical polarization in a target direction (Z) and transmit light (111) of an opposite, second elliptical polarization; and a second reflector (105) arranged to enclose said first polarizing reflector (103) in said plane (X-Y), and adapted to receive transmitted light (111) from the first polarizing reflector (103) and reflect elliptical polarized light (113) in the target direction (Z). By arranging the two reflectors enclosing a side-emitting light source, a higher efficiency can be obtained with a preserved beam shape.

16 Claims, 3 Drawing Sheets

ILLUMINATION DEVICE FOR PRODUCING A POLARIZED LIGHT BEAM

Figure 1A:
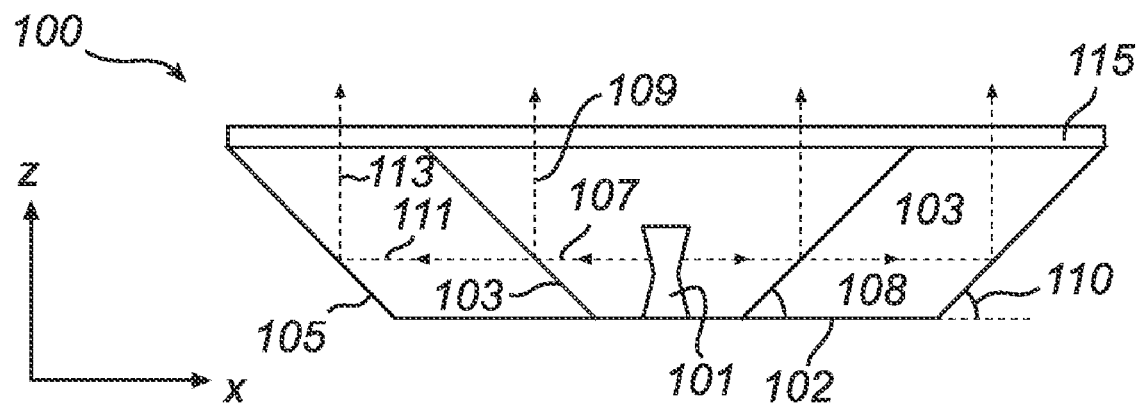

This application is a national stage application under 35 U.S.C. §371 of International Application No. PCT/IB2007/051191 filed on Apr. 3, 2007 and published in the English language on Oct. 11, 2007 as International Publication No. WO/2007/113768, which claims priority to European Application No. 06112309.7, filed on Apr. 6, 2006, incorporated herein by reference.

The present invention relates to an illumination device comprising a polarizing reflector for producing a polarized light beam.

In a variety of different light emitting applications there is a need for, or is beneficial to employ, polarized light. For example, it is desirable to have car headlights which produce polarized light in order reduce glaring effects, and in Liquid Crystal Displays (LCDs), there is a need for polarized light as display backlight.

Often a desire, or request, for polarized light is accompanied by requirements on high efficiency (low energy loss when the polarized light is generated), a certain light beam shape and/or price. Meeting up with all or some of these requirements often can be problematic or even an obstacle when it comes to implementation and/or commercialization of many ideas involving polarized light.

One known way of producing polarized light involves using a polarizing beam splitter (PBS) together with a reflective reflector, such as a mirror. U.S. Pat. No. 5,042,925 discloses a PBS having a birefringent oriented polymer adhesive layer. Although this allows for high efficiency, the resulting light beam is broadened and the beam shape is not preserved.

It is an object of the present invention to overcome problems in the prior art. A specific object is to allow for producing a polarized light beam of high efficiency with a predetermined and well-defined beam shape.

This and other objects that will be evident from the following description, are achieved by an illumination device for providing a polarized light beam
that comprises a light source having a light emitting surface arranged to emit light in a plane; a first polarizing reflector arranged to enclose the light source in this plane, and adapted to receive the emitted light, reflect light of a first elliptical polarization in a target direction and transmit light of an opposite, second elliptical polarization; and
a second reflector arranged to enclose the first elliptical polarizing reflector in the plane, and adapted to receive transmitted light from the first elliptical polarizing reflector and reflect elliptical polarized light in the target direction.

By arranging the two reflectors enclosing a side-emitting light source, a higher efficiency can be obtained with a preserved beam shape.

The light source typically comprises a light emitting diode (LED) combined with beam shaping optics, for example for facilitating emission of light in one plane. Such a LED is referred to as a side-emitting LED. The light-emitting surface is the surface of the beam shaping optics. The light source is preferably arranged symmetrically in relation to the first reflector in the plane.

The expression "enclose in a plane" is here intended to mean that an enclosing part is present in virtually all directions from the enclosed part in the plane. However, there may be one or a number of small, continuous sections in the enclosing part, i.e. certain directions, or angular sections, where the enclosing part is not present. Compare this to a situation with a net that encloses an object. The net comprises a number of holes, yet the object is considered enclosed by the net.

The expression "elliptical polarized light" comprises polarized light with phase shifted field components. Thus elliptical polarized light comprises circular polarized light, which is a special case of elliptical polarized light, namely when field components are phase shifted by 90 degrees, (a quarter-wave). However, the definition excludes linear polarized since field components in linear polarized light are in phase.

Circular polarized light allows for a more uniformly polarized light beam and thus allows for more convenient and efficient conversion to linear polarized light. One reason for this is owing to the "infinite" symmetry of a circle, which results in that a circle only can be oriented in one way and thus circular polarized light conveniently can be added to other circular polarized light. Compare this to a case of elliptical polarized light. Ellipses may be of equal size and shapes but still be oriented differently with respect to each other. However, it should be noted that completely circular polarized light is hard to accomplish in practice and that elliptical polarized light to some extent typically need to be accepted, although it is typically desired to have elliptical polarized light that is as close to circular polarized light as possible.

The second reflector may be a non-polarizing reflector, such as a metallic reflector. Since a metallic reflector phase-shift one of the field components of incident light by 180° (one half wave length), the result is elliptical polarized light of the same direction as from the first reflector, and thus the light from the two reflector can be added to form a uniformly polarized light beam in the target direction. However, it should be noted that in practice there typically are deviations, and there may still be some phase difference between light reflected from the first reflector and light reflected from the second reflector.

The second reflector may alternatively be a polarizing reflector, in which case the light transmitted by the first reflector is polarized again.

The first and second reflectors preferably extend sufficiently in the target direction so that virtually all light emitted by the light source are received by the reflectors.

The device may further comprise a phase-shifting plate adapted to convert reflected polarized light into polarized light of a single predetermined direction. The phase shifting plate may be a quarter wave plate and/or the phase shifting plate may have two areas which exhibit different phase-shifting properties.

One way of obtaining a desired phase-shift is by adapting the size of the phase-shift, for example, one area may correspond to a quarter-wave plate, the other to a half-wave plate. Another way of obtaining a desired phase-shift, which may be combined with the first way, is by adapting, or orienting, optical axes of the two areas.

The two areas may provide a phase shift relative to each other so that the final light is linear polarized, and wherein a first area is arranged to receive the reflected elliptical polarized light from the first reflector and a second area is arranged to receive reflected elliptical polarized light from the second reflector.

This and other aspects of the present invention will now be described in more detail, with reference to the appended drawings showing a currently preferred embodiment of the invention.

FIG. 1a schematically shows a cross-sectional side view of an illumination device according to a first embodiment.

Figure 1B:
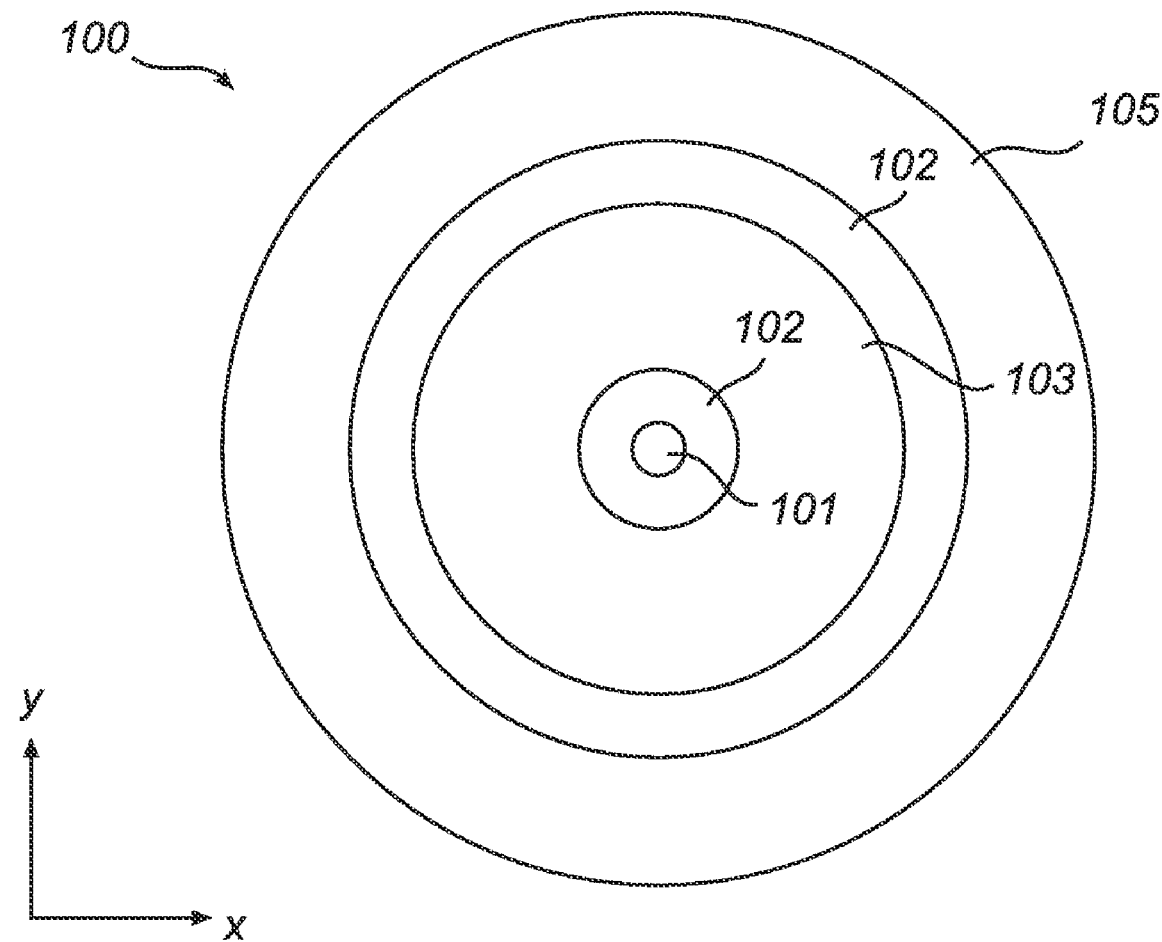

FIG. 1b schematically shows a top view of the illumination device in FIG. 1a.

Figure 2:
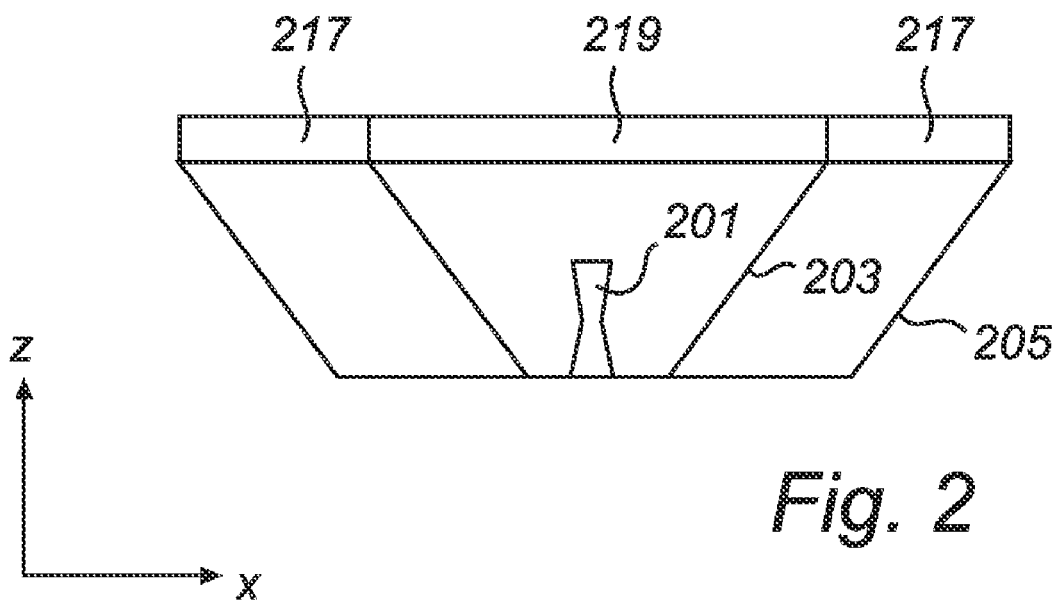

FIG. 2 schematically shows a cross-sectional side view of an illumination device according to a second embodiment.

Figure 3:
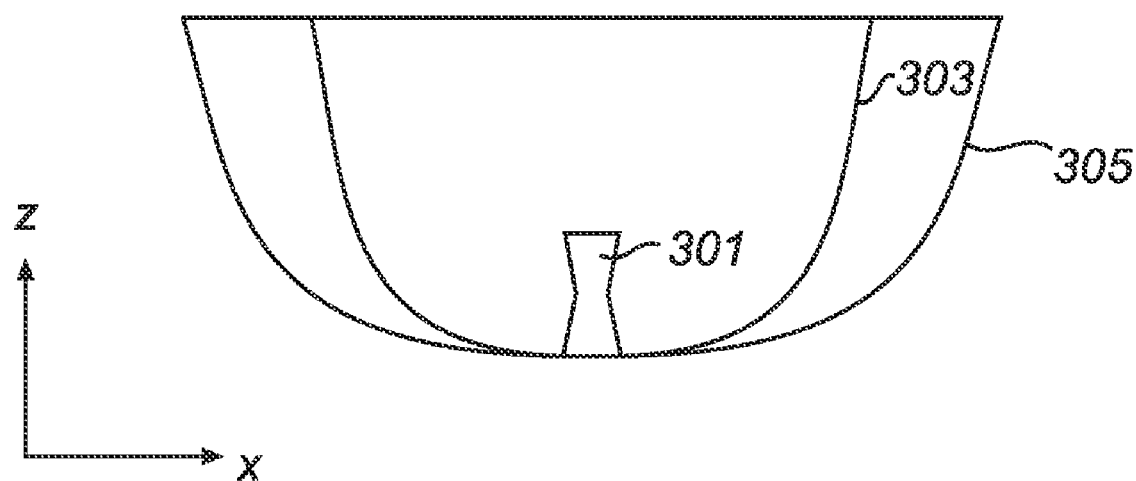

FIG. 3 schematically shows a cross-sectional side view of an illumination device according to a third embodiment.

Figure 4:
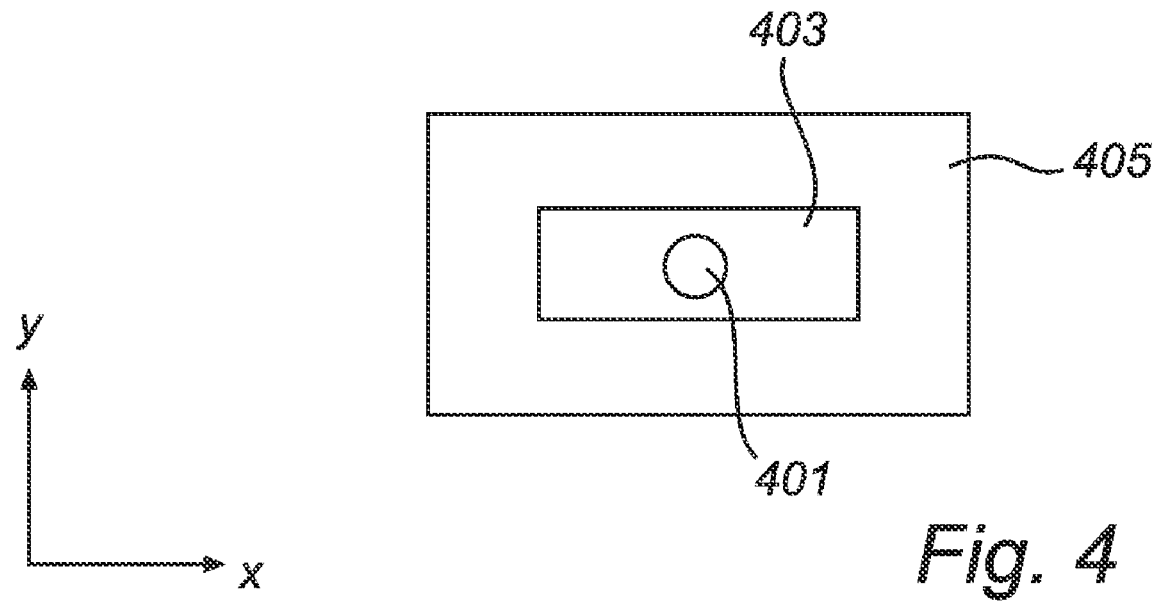

FIG. 4 schematically shows a top view of an illumination device according to a fourth embodiment.

Figure 5:
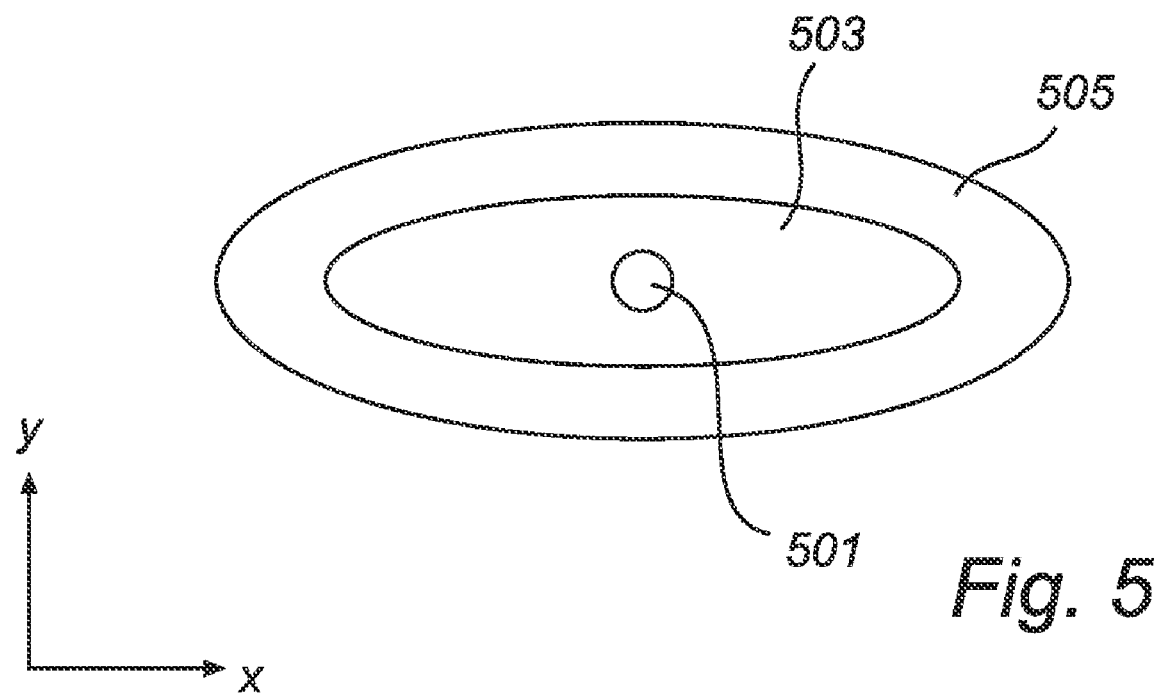

FIG. 5 schematically shows a top view of an illumination device according to a fifth embodiment.

FIG. 1a and FIG. 1b schematically shows a cross-sectional side view and a top view respectively of an illumination device 100 according to a first embodiment of the invention. It should be noted that although the terms "side" and "top" are used, the device 100 may be flipped, rotated and positioned in various ways in order to produce a light beam in a desired direction. A light beam may in the context of this application be seen as a bundle of light rays that have at least one common directional component, i.e. a beam is a macro level manifestation of the rays. For example, in a collimated light beam the rays are parallel, and the light beam and the rays have the same direction. On the contrary, in a spreading beam there might be none or only a few light rays that that mainly has the same direction as the beam.

A light source 101 is arranged to emit unpolarized light. The light source comprises a light generating element, for example a light emitting diode (LED), and beam shaping optics, for example made of a transparent polymeric material, which is adapted so as to make the light source emit light in a desired way. In the figure, the beam shaping optics can be seen as an hourglass shape representing the light source 101, while the light generating element, which typically is comparatively small and located in or below a supporting surface 102 of the beam shaping optics, is not explicitly shown. Here the beam shaping optics is arranged such that light is substantially emitted from the surface of the beam shaping optics in a X-Y plane (or parallel X-Y planes). For reasons of convenient presentation, the emitted light is represented by a light ray 107. Here the light source 101 is arranged to emit light in all directions in the X-Y plane, however, in practice and of economical and/or implementational reasons, there may be some divergence and thus emission also in other directions.

In order to prevent light emission in the Z-direction, the beam shaping optics can be combined with a reflector in the Z-direction, preferably a polarizing reflector. Such a polarizer can then be combined with suitable optical elements in the target direction in order to provide light of the desired polarization.

It should be noted that X, Y and Z references are used for presentational reasons and that the invention by no means is limited or bound to any particular coordinate system.

The light source 101 is enclosed in the X-Y plane by a first reflector 103, which is arranged to receive the light emitted from the light source 101. The light source 101 is symmetrically, here circle symmetrically, arranged in the X-Y plane with respect to the enclosing first reflector.

The extension of the first reflector's envelope surface in the Z-direction typically depends on the extension of the light source 101 in the same direction, or at least the extension of a light emitting part of the light source 101. In the example of FIG. 1a the first reflector's 103 envelope surface has greater extension than the light source in the Z-direction, which for example may be a way to make the first reflector to receive more light when the light source emits light not only in the X-Y plane. In order to reach high efficiency, the first reflector's envelope surface typically should have an extension in the Z-direction such that reception of substantially all, or most, of the emitted light 107 from the light source 101 is enabled.

The first reflector 103 is enclosed in the X-Y plane by a second reflector 105, which is arranged to receive the transmitted light 111 from the first reflector 103. In the shown example, the extension of the second reflector's envelope surface in Z-direction is substantially the same as for the first reflector. A space, which in FIG. 1a can be seen between the first reflector 103 and the second reflector 105, may be an air-filled cavity or for example may comprise a transparent non-birefringent solid, such as a polymer. The first and second reflector can have similar shape. Shape may here refer to the shape in a plane perpendicular to the resulting light beam, but also, although not necessary, to the shape when viewed along the direction of the light beam. In the later case same shape may include similar envelope surfaces, for example having linear slopes with substantially equal slope angles.

In another embodiment the extension in the Z-direction of the envelope surfaces of two reflectors 103, 105 may differ from each other, however, in any case, the second reflector 105 typically should have an extension that enables reception of substantially all, or most, of the transmitted light from the first reflector 103. When the emitted light 107 exhibits some divergence, i.e. light is emitted not only in X-Y planes, the divergence will be more significant farther away from the light source 101. Thus, in order to receive such divergent light, the second reflector's 105 envelope surface may be arranged to extend farther in the Z-direction than the first reflector's 103 envelope surface.

In order to reflect light emitted in the X-Y plane and produce a light beam in the perpendicular Z-direction, it should be understood that the first and second reflectors 103, 105 are preferably funnel-shaped, i.e. have cross-sections with larger perimeters in the Z-direction. The truncated cone shape of the device 100 in FIG. 1.a and FIG. 1b, may be recognized as belonging to a funnel-shape sub-group, which is constituted by funnels that have an envelope surface with a linear slope. A linear slope typically, but not necessary, is used when the light source mainly emit light in planes, here the X-Y plane.

Still referring to FIG. 1a and FIG. 1b, the slope angles 108, 110 of the first reflector's 103 and second reflector's 105 envelope surfaces are 45° in relation to the X-Y plane. It should be noted that the light source 101, which mainly emits light in the X-Y plane, in combination with the slope angle of 45°, allows for a collimated light beam that is well-defined and where a shape of a projection of the beam in general will resemble the shape of the reflectors in the X-Y plane, e.g. the shape presented in FIG. 1b. However, it should be noted that in a practical situation, due to non-ideal, imperfect materials and tolerances, perhaps pertaining to what need be accepted of commercial reasons, there will, to some extent, still be some divergence and spread of light rays.

The first reflector 103 is a polarizing reflector that reflects received, i.e. incident, light 107 from the light source 101, as circular polarized light of a first direction (left or right circular) in a target direction, here corresponding to the Z-direction. The reflected light from the first reflector is represented by a light ray 109.

It should here be noted that it is often hard to accomplish completely circular polarized light in practice. Although circular polarized light is desired and although the reflector may be arranged to provide circular polarized light, the polarized light is still often elliptical to some degree. Circular polarized light can be seen as a special case of elliptical polarized light, namely when the field components are equal in size and phase-shifted relative to each other by exactly 90° (a quarterwavelength). However, instead of here denominating the light "elliptical polarized", which has a very broad definition, "circular polarized light" still will be used in the following. One reason is that "circular polarized" describes a desired and preferred property, and even when the polarized light to some degree is elliptical, it is still desired to have the elliptical light as close to circular polarized as possible.

It should now be readily understood that what here is denominated as "circular polarization", in a practical situation may involve some degree of elliptical polarization and that thus the meaning of "circular polarized" in the following should not be too strictly interpreted.

Further, the first reflector 103 is transparent to, and transmits, circular polarized light of a second direction, here opposite to the first direction. The first reflector 103 may for example be a cholesteric liquid crystal reflector, or a reflective linear polarizer combined with a quarter-wave plate. In the latter example, the quarter wave plate may be laminated on the reflective linear polarizer.

It should be readily understood that any other type of reflector, or reflector arrangement, that reflects one direction of circular polarized light and transmit the other, can be used as an alternative. The light transmitted by the first reflector 103 is represented by a light ray 111.

The second reflector 105 is here an ordinary reflector, such as a metallic reflector or mirror, which phase-shifts one of the field components of circular polarized light by 180° (one half-wave length). This changes direction of the circular polarized light 111 (second direction) to the opposite direction (first direction). Thus the second reflector 105 reflects received light 111 from the first reflector 103 as circular polarized light of the first direction. Also, the light is reflected in the same direction as the light reflected from the first reflector 103, i.e. corresponding to the Z-direction in FIG. 1a.

It should be appreciated that due to the "infinite" symmetry of a circle, reflected circular polarized light can add up and form a uniformly polarized light beam in the target direction, i.e. here the Z-direction, independent on where in the X-Y plane reflections have occurred.

In order to produce a linear polarized light beam of a predetermined, single direction, a quarter-wave plate 115 may be arranged in the path of the light beam of circular polarized light. It should be noted that in a practical situation, as referred to in the foregoing, the light beam may be elliptically polarized to some degree, and in such case, the phase shifting properties, or retardation, of the quarter-wave plate typically should be adjusted accordingly in order to produce linear polarized light.

It may be noted that when a conventional dichoric polarizer is used for producing linear polarized from unpolarized light, about 50% of the light is absorbed. In the example of FIG. 1a and FIG. 1b, polarized light is "extracted" twice and virtually all emitted light is used to form a uniformly polarized light beam, which allows for high efficiency.

In another embodiment, the first reflector 103 is a circular polarizer that is made of a reflective polarizer with a quarter-wave plate arranged in the path of the reflected linear polarized light. The quarter-wave plate may be laminated on top of the reflective polarizer.

It may be noted in FIG. 1a that the light source 101 and the reflectors 103, 105 extend from a base plane, or supporting surface, 102. However, although this is a natural and straightforward design, in alternative embodiments, the light source 101 and the reflectors 103, 105 may extend from, or be supported at, different planes or levels.

Although it is not an issue in most situations, it may be noted that when the device 100 produce a highly collimated light beam, there may be non-illuminated, or less illuminated, areas in a projection of the light beam. These areas correspond to areas in the X-Y plane from where no light is reflected in the Z-direction. In FIG. 1b such areas could correspond to the light source 101 and the parts of the supporting surface 102 that are visible between the light source 101 and the first reflector 103, and between the first and second reflector 103. 105. When the degree of collimation decrease, increasing illumination of the area typically follows.

Although non-illuminated areas typically are not desirable, there may be situations where their existence is negligible, tolerable or even desired. For example, in a situation when the resulting light beam is to be scattered or diffused on purpose, which for example often is the case for LED backlights, any non-illuminated area in a projection of the beam before it is scattered or diffused, may be of less importance.

In most situations the degree of collimation of the emitted light is moderate. Thus, there is typically a relatively uniform illumination in a far field also when the light source 101 and the reflectors 103, 105 are positioned such as in FIGS. 1a and 1b.

It should be noted that arrangement of the first reflector 103 close to the light source 101 and/or the second reflector 105 close to an outer edge of first reflector 103 in the X-Y plane, e.g. in order to reduce non-illumined areas, may impose a risk of interfered and scattered or blocked light. For example, light rays reflected by the first reflector 103 might interfere with an edge or surface of the light source 101, and light rays reflected by the second reflector 105 might interfere with the first reflector's 103 envelope surface, or an edge thereof.

It may be noted that in a situation when the slope angles 108, 110 of the reflector's 103, 105 envelope surfaces deviate from 45°, the result may be less collimation, at least when the light 107 from the light source is mainly emitted in the X-Y plane, and thus there will be either a focusing light beam or a spreading light beam.

First and second reflectors' 103, 105 slope angles 108, 110 between 45° and 90°, result in a focusing light beam where the reflected rays are directed not only in the Z-direction, but also to a center of the reflectors 103, 105.

Slope angles 108, 110 between 0° and 45°, result in an unfocusing, spreading light beam, with a non-illuminated center area.

By selecting an inner, first reflector 103 slope 108 below 45° and an outer, second reflector 105 slope 110 above 45°, the result is a light beam comprising an outer, focused light beam part directed towards the center of the reflectors 103, 105 and an inner, unfocused light beam part directed towards the perimeter of the reflectors 103, 105. A result from this is a wide, spread light beam of polarized light. It is understood that in such a situation there are typically no non-illuminated areas in a projection of the light beam.

Still referring to FIG. 1a and FIG. 1b, the resulting light beam from the two reflectors 103, 105 in the first embodiment is circular polarized of a single direction. In order to produce uniform linear polarized light, a quarter-wave plate 115 can be arranged on top of the reflectors 103, 105, i.e. in the path of the reflected light 109, 113. The quarter-wave plate is arranged according to known methods such that an optical axis of the quarter wave plate has a predetermined direction in relation to the direction of incident light so as to result in linear polarized light of a desired, predetermined direction. In order to facilitate conversion of the light beam from circular polarized light to linear polarized light, typically a collimated light beam is desired. However, it should be noted that a fully or highly collimated beam is not required and that a high degree of collimation often is hard to accomplish in practice, at least when costs should be kept low. Commercially available LEDs combined with beam shaping optics that may be used as the light source 101, today typically delivers light with a collimation of about 20° measured at full width at half maximum (FWHM) intensity.

In an alternative embodiment, light 109, 113 reflected from the first reflector 103 and the second reflector 105 are circular polarized in opposite directions. In this alternative embodiment the second reflector 105 may be an polarizing reflector, such as a cholesteric liquid crystal reflector, which reflect circular polarized light of the second direction. An example of a such second reflector is a cholesteric liquid crystal reflector, i.e. in this alternative embodiment, the material of the first and the second reflectors 103, 105 may be the same, although their properties may differ. A half-wave plate may then be arranged in the path of reflected light from only one of the reflectors 103, 105 so as to change direction in polarization of the reflected light from that reflector. A quarter-wave plate 115 may then be used in a similar manner as described above, in conjunction with the first embodiment, in order to produce linear polarized light. The phase shifting properties of a half-wave plate and the quarter-wave plate may be combined in a single phase-shifting plate.

FIG. 2 schematically shows a cross-sectional side view of a illumination device 200 according to a second embodiment, which may be used when linear polarized light is desired, and when light reflected from a first reflector 203 and a second reflector 205 are circular polarized in opposite directions. In FIG. 2, there is a phase-shifting plate having two areas, 217, 219 corresponding to two quarter-wave plates. It should be understood that when the reflectors 203, 205 are circular in the X-Y plane, the two areas 217, 219 appear as annular areas of different properties and/or different orientation of their optical axes in said plane. For example, the function of one of the areas, 217, 219 may correspond to that of a half-wave plate combined with a quarter-wave-plate and the other area 217, 219 may function just as a quarter-wave plate.

In an alternative embodiment, the areas 217, 219 corresponds to two quarter-wave plates, wherein the fast optical axis of each plate is arranged at 90° with respect to the fast optical axis of the other plate.

As previously mentioned, when the light is not circular polarized, but instead elliptical polarized to some extent, the phase shifting properties, or retardation, of the quarter-wave plates typically should be adjusted accordingly, in order to produce linear polarized light.

FIG. 3 schematically shows a cross-sectional side view of a illumination device 300 according to a third embodiment, where envelope surfaces of a first and second reflector 303, 305 have a non-linear, parabolic slope. A slope having a curvature is typically used when a light source 301 emit light in various directions and not only, or mainly in a plane, such as an X-Y plane, i.e. when the light source 301, for example, is an omnidirectional light source. The non-linear slope is typically adapted so as to reflect incident light from the light-source 301 in the target direction Z.

In another embodiment, only one reflector has an envelope surface with a curvature.

It should be understood from the foregoing that the shape of the resulting light beam is influenced by the design and shape of the reflectors. Typically a projection of the light beam in the X-Y plane resembles the shape of the reflectors in the same plane, e.g. circular. Typically one reflector is responsible for the perimeter part of such an projection, and thus that reflector will have the greatest influence on the shape of the projection. Typically that reflector is the second reflector.

Correspondence between shape and size of the reflectors in the X-Y plane and shape and size of a light beam the projection in the same plane increase with the degree of collimation of the light beam. However, it should be noted that due to the arrangement of the reflectors, there typically will be a correspondence between the shapes, even when there is a lower degree of collimation.

This far only circular reflectors has been presented, however, when a light beam projection of other shapes is desired, the reflectors may be adapted accordingly.

FIG. 4 schematically shows a top view of a illumination device 400 according to an embodiment with rectangular reflectors 403, 405.

FIG. 5 schematically shows a top view of a illumination device 500 according to an embodiment with elliptical reflectors 503, 505.

It may be noted that first and second reflectors that have been presented so far have been of similar shape. However, in alternative embodiments the two reflectors may have different shape, for example a circular inner, first reflector combined with an outer, second rectangular, or elliptical reflector.

From the above description it should be clear that by adapting shape, size and slope of the reflectors, a well-defined, uniformly polarized light beam of a desired size and shape can be produced.

The person skilled in the art realizes that the present invention by no means is limited to the preferred embodiments described above. On the contrary, many modifications and variations are possible within the scope of the appended claims. For example, in the foregoing the light source and the reflectors has been concentric, however, although this typically is preferred, any of the reflectors and/or the light source may be displaced so that there will be an arrangement that is not considered concentric, or where the light source is not symmetrically arranged in a reflector.

The invention claimed is:

1. An illumination device for providing a polarized light beam, the device comprising:
   a light source having a light emitting surface arranged to emit unpolarized light substantially in a plane (X-Y) and having a shaping optic;
   a first polarizing reflector arranged to enclose a light emitting surface of said light source in said plane, and adapted to receive said light, reflect light of a first elliptical polarization in a target direction (Z) and transmit light of an opposite, second elliptical polarization; and
   a second reflector arranged to enclose said first polarizing reflector in said plane and adapted to receive transmitted light from the first polarizing reflector and reflect elliptical polarized light in the target direction (Z);
   wherein said second reflector phase-shifts a field a component of said transmitted light from said first polarizing reflector by about one-half wave length to create substantially circular polarized light with equal field components having two plane waves of equal amplitude phase shifted relative to each other by 90 degrees.

2. A device as claimed in claim 1, wherein the second reflector is a polarizing reflector.

3. A device as claimed in clam 1, wherein the first and/or second polarizing reflector is a circular polarizing reflector and the elliptical polarized light is substantially circular polarized.

4. A device as claimed in clam 1, wherein the second reflector is a non-polarizing reflector.

5. A device as claimed in claim 1, wherein at least one of said reflectors is funnel-shaped with a larger opening facing the target direction (Z).

6. A device as claimed in claim 5, wherein at least one of said reflectors are circle symmetric in said plane (X-Y).

7. A device as claimed in claim 5, wherein at least one of said reflectors has an envelope surface with a linear slope.

8. A device as claimed in claim 7, wherein the slope angle is in the range of 20°-70°.

9. A device as claimed in claim 1, wherein the first reflector has an extension in the target direction (Z) such that virtually all light emitted by the light source is received by the first reflector.

10. A device as claimed in claim 1, wherein the second reflector has an extension in the target direction (Z) such that virtually all light transmitted by the first reflector is received by the second reflector.

11. A device as claimed in claim 1, wherein the first reflector and second reflector are substantially concentric.

12. A device as claimed in claim 1, wherein the device further comprises a phase-shifting plate adapted to convert reflected polarized light into polarized light of a single predetermined direction.

13. A device as claimed in claim 12, wherein the phase shifting plate is a quarter wave plate.

14. A device as claimed in claim 12, wherein the phase shifting plate comprises two areas exhibiting different phase-shifting properties, wherein a first area is configured to receive light reflected by the first reflector and a second area is configured to receive light reflected by the second reflector.

15. A device as claimed in claim 8, wherein the slope angle is about 45°.

16. An illumination device, comprising:
   a centrally disposed light source, said light source including beam shaping optics to direct emitted light from said light source substantially in an X-Y plane, said light source including a Z direction reflector;
   a first polarizing reflector enclosing and surrounding said light source;
   said first polarizing reflector extending beyond said light source in said Z direction to include an envelope to reflect Z direction light emissions,
   wherein said first polarizing reflector has a surface to receive said emitted light from said light source;
   further wherein said first polarizing reflector having said envelope reflects light of a first elliptical polarization in said Z direction and transmits light of an opposite second elliptical polarization through said reflector to a second reflector;
   said second reflector circumscribing said first reflector and receiving said transmitted light of said opposite second elliptical polarization to thereby reflect said light as elliptical polarized light in said Z direction in a phase shifted orientation relative to said reflected light of said first elliptical polarization.

* * * * *